Patented Aug. 4, 1936

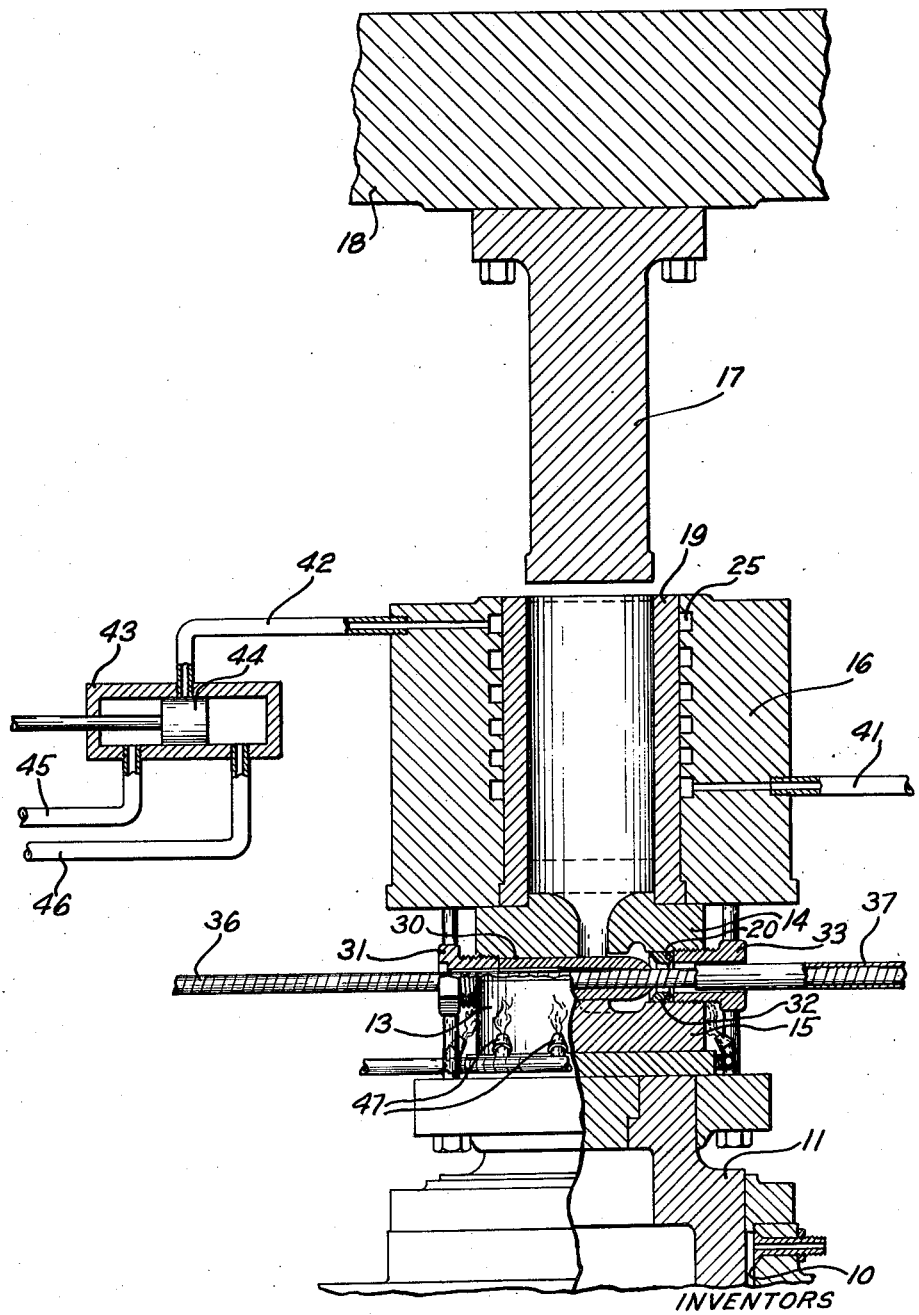

2,049,938

UNITED STATES PATENT OFFICE 2,049,938

METHOD OF EXTRUDING LEAD

Harvey A. Anderson, Western Springs, Randall Gillis and Walter W. Kagi, La Grange, and Clarence T. Prendergast, Chicago, Ill., assignors to Western Electric Company, Incorporated, New York, N. Y., a corporation of New York Application August 29, 1934, Serial No. 741,888

10 Claims. (Cl. 207—10)

This invention relates to a method of extruding lead, and more particularly to a method of producing lead-calcium alloy cable sheaths.

Age-hardening lead-calcium alloys differ in many of their characteristics from lead and other lead alloys and, therefore, the methods used in the extrusion of lead and such other lead alloys are not effectively applicable to produce high quality sheath in the extrusion of lead-calcium alloys.

Objects of the present invention are to provide an effective and efficient method of producing lead-calcium articles, such as cable sheaths.

In accordance with one embodiment of the invention, a lead-calcium alloy is extruded in the vicinity of its solid solubility temperature and at a temperature sufficiently high to prevent precipitation and detrimental agglomeration of the age-hardening constituent. The hardness of the alloy is then controlled by the rate of cooling of the extruded alloy or by selecting the proper calcium content.

Other objects and advantages will appear as the description proceeds.

A complete understanding of the invention may be had by reference to the following description taken in conjunction with the accompanying drawing, in which the single figure is a cross-section of a lead extrusion apparatus embodying the invention and by means of which the method of the invention may be practiced.

In the manufacture of lead-calcium alloy cable sheaths of the type disclosed in the patent to R. S. Dean 1,890,014, December 6, 1932, we have found that in order to obtain a sheath of uniform concentricity and of uniform physical properties, such as tensile strength, fatigue resistance, and the like, an accurate temperature control should be carried out to maintain the temperature in all parts of the apparatus above the value at which detrimental precipitation and agglomeration of the age-hardening constituent sets in. Agglomeration is caused by allowing the lead calcium alloy to reach a temperature at which precipitation sets in and holding it at this temperature for such a time as to allow the precipitated particles to grow beyond the critical hardening size. A slight amount of agglomeration is permissible. If the age-hardening constituent is allowed to agglomerate to too great an extent, it appears that the large size of the agglomerated particles prevents the grain growth of the lead and the resulting fine grain lead has a low tensile strength and low fatigue resistance. However, when the lead-calcium alloy is extruded above the temperature of detrimental precipitation and agglomeration and is subsequently cooled at a rate sufficient to prevent the excessive agglomeration of the age-hardening constituent, the age-hardening constituent is dispersed in minute particles which appear to act as keys or wedges to prevent slipping along the slip planes of the lead crystal structure and consequently produce a hardening of the lead.

In practicing the invention a lead extrusion apparatus of the type shown in the drawing may be used, which comprises a hydraulic cylinder 10 and a ram 11 slidably mounted in the hydraulic cylinder. The ram 11 carries a die block 13 and an extruding cylinder 16, the die block having an upper portion 14 and a lower portion 15, respectively. The ram 11 is actuated by hydraulic pressure to carry the cylinder 16 into a position wherein a plunger 17 may enter the cylinder. Continued upward movement of the ram 11 will cause a plunger 17 to displaces the lead which may be contained in the cylinder. The plunger 17 depends from a support 18 which is secured in spaced relation with respect to the hydraulic cylinder 10. The die block 13 is in direct communication with the cylinder 16. Mounted within the die block is a core tube 30 spaced and held in position by means of an adjusting nut 31, and a die ring 32 held in position by means of an adjusting nut 33. A cable 36 is passed through the core tube and die and is covered with a sheath 37 of the lead alloy.

The cylinder 16 is preferably provided with a liner 19. The use of chromium nickel steel has been found satisfactory for the liner although if desired other metal having a higher heat conductivity may be used, provided it has other necessary properties, such as tensile strength and poor solubility in molten lead.

The upper portion comprising approximately two-thirds of the cylinder is provided with a spiral duct 25 encircling the cylinder through which a cooling or heating medium may be passed. The lower end of the spiral duct is provided with an outlet 41 and the upper end is provided with an inlet 42 connected to a valve 43. By shifting a piston 44 of the valve in one direction, a cooling medium from an inlet 45 may be circulated through the cooling duct and by shifting it in the opposite direction a heating medium, such as steam, from an inlet 46 may be circulated through the duct. The piston 44 may be shifted manually or by any other suitable means (not shown).

A lead-calcium alloy having a calcium content of approximately .04% is first melted in a lead kettle and brought to a temperature of about 750° F. The lead at approximately this temperature is transferred to the cylinder 16 of the extrusion apparatus. The transfer may be effected by the method described in the copending application of E. E. Schumacher and G. M. Bouton, Serial #657,802, filed February 21, 1933. Only about seven-eighths of the charge in the cylinder is extruded each time; and if a previous charge has been extruded from the cylinder, a slug of the previous charge will remain in the bottom of the cylinder. As soon as the withdrawal of the ram 17 of the extrusion apparatus is begun after extruding a charge, cooling water is circulated through duct 25 by shifting the piston 44 of the valve 43 to the right. A new charge is then transferred to the cylinder and the dross which rises to the top of the cylinder is skimmed off. A suitable method and apparatus for skimming the dross from the lead is disclosed in the copending application of J. L. Alden and H. A. Anderson, Serial #681,270, filed July 20, 1933. The ram is then brought into engagement with the charge with the pressure sufficient to extrude a short length of sheath during a solidification and equalization period of about five and one-half minutes, reckoned from the time when the pressure was applied to the lead cylinder. The cooling water is allowed to circulate for approximately three minutes or just long enough with the subsequent equalization step to prevent molten lead from blowing out in the subsequent extrusion. The piston 44 is thereafter shifted to pass a heating medium such as steam, at a high pressure through the duct 25 during the remainder of the extrusion stroke. As above indicated it is desirable to start the cooling of the cylinder early in the recharging portion of the cycle. There is, however, a substantial interval of time required for recharging and it is within the contemplation of the invention to begin the application of cooling medium at any time up to the beginning of the solidification period. During the time that the cooling water was circulated through the duct of the cylinder, the lead adjacent the walls of the cylinder was cooled to a greater extent than the lead in the interior of the cylinder. The subsequent passing of steam through the duct will heat the lead adjacent the walls of the cylinder, or if the temperature of the steam is lower than that of the lead it will at least prevent any further substantial loss of heat therefrom and afford an opportunity for the temperature of the entire charge to equalize. After the five and one-half minute cooling and equalizing period, the lead in the cylinder should have a temperature in the region of the solid solubility temperature. The heating medium preferably is circulated during the complete extrusion stroke or at least for a sufficient portion thereof to prevent undue cooling of the upper portion of the charge. Instead of using steam, other heating media may be used for circulation through the duct or electrical heating means may be embedded in the cylinder. In case a heating medium other than steam is used, it may be desirable to pass it through a different duct from the one used for the cooling water.

The slug remaining in the bottom of the cylinder will be heated by the new charge and then fused therewith. The slug will also cool the lower portion of the new charge to substantially the same extent as the remainder of the new charge is cooled by the cooling means. During the time that the charge is cooling, sufficient pressure is applied to the charge to extrude about 2 feet of cable having an inside diameter of 2⅜ inches and a wall thickness of ⅛ inch, this length, however, varying with the size of cable extruded, a longer length being extruded of smaller sheath the purpose being to discharge substantially the same amount of lead during this period irrespective of the size of the sheath. The lead in the die block would cool to too great an extent during the recharging of the cylinder and the following cooling and equalizing of the charge if no heat were applied to the die block. For this purpose a plurality of gas burners 47 are provided to maintain the die block at a temperature of about 475° F. These burners may be supplied with combustible gas from any suitable source (not shown). This temperature is slightly below the solid solubility temperature of a .04% calcium alloy but is sufficiently high to prevent cooling of the alloy below the temperature at which a detrimental precipitation and agglomeration of the age-hardening constituent of the alloy takes place. Also this temperature is not so high as to scorch the insulating materials on the cable being sheathed, particularly when the extruded cable is caused to creep during the cooling and equalizing period as described above.

We have found the arrangement and temperatures described above suitable for use with an extrusion apparatus of the type shown having a cylinder approximately 24 inches long and 10 inches in diameter having a capacity of about 700 pounds of lead. For cylinders of other dimensions slight changes may have to be made in the cycle of operations to bring the lead alloy to the desired temperatures in the cylinder and extruding die.

In some cases, particularly in the extrusion of small sizes of cable it is advisable to cool the die 32, since in small sizes of cable it is more difficult to dissipate heat and also a larger amount of heat is generated in forcing the lead through a small die. The die may be cooled by passing water or steam through a duct 20 in the die, or a method and apparatus for cleaning and cooling a die, such as disclosed in the copending application of H. F. Carter, Serial #673,834, filed June 1, 1933, may be used.

The sheathed cable with the calcium in substantially solid solution in the lead is fed from the extrusion apparatus onto a reel preferably of heat insulating material, such as wood, and is wound in close convolutions. This prevents excessive cooling of the sheath during the reeling operation and when a reel is full, an asbestos blanket is wrapped over the outer convolutions of the wound sheath to prevent too rapid cooling of the lead-calcium alloy, since rapid cooling of a .04% calcium alloy would render the sheath too hard and difficult to handle for many purposes.

Instead of using a lead-calcium alloy having a calcium content of .04%, the required degree of hardness may be obtained by using an alloy of a lower calcium content, as for instance a calcium content of .03%. For such a calcium content the solid solubility temperature is lower and consequently a lower temperature may be used in the lead extrusion apparatus without danger of precipitation and agglomeration of the age-hardening constituent. The required degree of hardness is then obtained by more rapid cooling, as for instance by omitting the blanketing of the fully wound reel.

While the invention has been described with particular reference to lead-calcium alloys having a calcium content of .04% or less, it will be evident that the temperatures specified may be varied in accordance with the solid solubility temperature of various lead-calcium alloys, as shown in the patent to Dean referred to above, and many other changes and modifications within the scope of this invention will be apparent to those skilled in the art.

What is claimed is:

1. A method of making extruded lead alloy articles which comprises charging the cylinder of a lead extrusion apparatus with heated lead alloy, cooling the upper portion of the charge for a predetermined period in the cylinder, and applying heat to the upper portion of the charge for a predetermined period in the cylinder to equalize the temperature of the charge.

2. A method of making extruded lead alloy articles, which comprises charging the cylinder of a lead extrusion apparatus with molten lead alloy on a solid slug of the lead alloy remaining in the cylinder from the previous charge, applying a cooling medium to cool the new portion of the charge for a predetermined period, applying a heating medium to the cylinder for a predetermined period to equalize the temperature of the charge and extruding the charge.

3. A method of extruding lead-calcium alloys, which comprises charging the cylinder of a lead extrusion apparatus with the molten alloy, cooling and equalizing the alloy to a temperature above the solid solubility temperature of the alloy by first applying a cooling medium to the press and discontinuing the application of the cooling medium prior to complete solidification of the alloy, and extruding the alloy at a temperature above the temperature of excessive precipitation and agglomeration of the age-hardening constituent of the alloy.

4. A method of extruding lead-calcium alloys, which comprises charging the cylinder of a lead extrusion apparatus with the molten alloy, applying such a pressure to the alloy as to produce a creeping of the extruded alloy to extrude a predetermined portion of the charge, cooling and then applying heat to equalize the temperature of the charge during said time, and then extruding the alloy more rapidly.

5. A method of extruding lead-calcium alloys, which comprises charging the cylinder of a lead extrusion apparatus with the molten alloy, cooling and equalizing the temperature of the charge by first applying a cooling medium to the extrusion apparatus and discontinuing the application of the cooling medium prior to complete solidification of the alloy, and then extruding the alloy.

6. A method of extruding lead-calcium alloys, which comprises charging the cylinder of a lead extrusion apparatus with the molten alloy, cooling the cylinder prior to the charging operation and continuing the cooling of the cylinder after it is charged, applying heat to the cylinder to equalize the temperature of the alloy, and extruding the charge from the cylinder at a temperature in the region of the solid solubility temperature.

7. A method of extruding lead-calcium alloy cable sheaths, which comprises heating the alloy to a temperature of substantially 750° F., charging the alloy into a cylinder of a lead extrusion apparatus, cooling and equalizing the temperature of the alloy in the cylinder to a temperature of approximately 550° F., and extruding the alloy around a cable at a temperature above the precipitation and agglomeration temperature of the age-hardening constituent.

8. A method of extruding lead-calcium alloy cable sheaths, which comprises charging the cylinder of a lead extrusion apparatus with the molten alloy, reducing the temperature of the alloy to substantially 550° F. in the cylinder, extruding the alloy through a die block around a cable to form a sheath, and heating the die block to a temperature of substantially 475° F. to prevent excessive cooling of the alloy in the die block.

9. A method of extruding lead-calcium alloys, which comprises charging the cylinder of a lead extrusion apparatus with the molten alloy, cooling the cylinder prior to the charging operation, applying heat to the cylinder to equalize the temperature of the alloy, and extruding the charge from the cylinder at a temperature in the region of the solid solubility temperature.

10. A method of making extruded lead alloy articles which comprises charging the cylinder of an extrusion apparatus with molten alloy upon a solid slug of a previous charge, cooling solely the upper portion of the cylinder while leaving the lower portion to be cooled by said slug, and extruding a major portion of the charge leaving a slug in the cylinder.

HARVEY A. ANDERSON.
RANDALL GILLIS.
WALTER W. KAGI.
CLARENCE T. PRENDERGAST.